United States Patent
Kaiser et al.

(10) Patent No.: US 6,528,563 B2
(45) Date of Patent: *Mar. 4, 2003

(54) LOW SOLIDS, HIGH STRENGTH MULTI-USE GELLED ADHESIVES AND ADHESIVE MASTICS

(76) Inventors: Conard E. Kaiser, 5817 Centralcrest, Houston, TX (US) 77092; Jock R. Collins, 5817 Centralcrest, Houston, TX (US) 77092; James R. Collins, 5817 Centralcrest, Houston, TX (US) 77092

( * ) Notice: Subject to any disclaimer, the term of this patent is extended or adjusted under 35 U.S.C. 154(b) by 9 days.

This patent is subject to a terminal disclaimer.

(21) Appl. No.: 09/739,540

(22) Filed: Dec. 15, 2000

(65) Prior Publication Data

US 2002/0004538 A1 Jan. 10, 2002

Related U.S. Application Data

(60) Provisional application No. 60/170,878, filed on Dec. 15, 1999.

(51) Int. Cl.[7] .................... C04B 24/00; C04B 24/26; C09J 121/02; C08K 5/16; C08K 5/17
(52) U.S. Cl. .................. 524/239; 524/247; 524/249; 524/556; 106/505; 106/823
(58) Field of Search .................. 524/234, 249, 524/247, 556; 106/505, 823

(56) References Cited

U.S. PATENT DOCUMENTS 6,201,050 B1 * 3/2001 Kaiser et al. .............. 524/239

FOREIGN PATENT DOCUMENTS

JP 58017157 A * 2/1983

* cited by examiner

Primary Examiner—David W. Wu
Assistant Examiner—Kelechi C. Egwim
(74) Attorney, Agent, or Firm—Kenneth A. Roddy

(57) ABSTRACT

Multi-use homogeneous breakable gelled adhesives and adhesive mastics which can be used "as is" for the installation of various types of tile, including tiles with deeply grooved backs, stone, marble, and other floor and wall coverings, flexible sheet goods, carpet and other uses, and can be mixed with a Portland cement powder to form a powerful latex-modified mortar having the added utility of a crack suppressive adhesive and functioning as a waterproofing membrane. The stabilized gelled adhesive or adhesive mastic prevents the separation and settling of components, and when Portland powdered cement is added, becomes a high strength latex modified mortar. The gelled adhesive or adhesive mastic is usable as a latex modified dry-set mortar. With the addition of Portland cement and silica sand, the gel will break and become a free-flowing liquid with additives which allow precise quantitation and easy mixing to produce a homogeneous latex modified thinset mortar that assumes the texture of a trowelable thinset mortar as more Portland cement/silica sand is added.

23 Claims, No Drawings

LOW SOLIDS, HIGH STRENGTH MULTI-USE GELLED ADHESIVES AND ADHESIVE MASTICS

CROSS REFERENCE TO RELATED APPLICATIONS

This application claims priority of U.S. Provisional Application Ser. No. 60/170,878 filed Dec. 15, 1999. This application is closely related to U.S. patent application Ser. No. 09/307,502, now U.S. Pat. No. 6,201,050 and U.S. patent application Ser. No. 09/668,783, now U.S. Pat. No. 6,448,317, which are hereby incorporated by reference to the same extent as if fully set forth herein.

BACKGROUND OF THE INVENTION

1. Field of the Invention

This invention relates generally to gelled adhesives, tile adhesives and dry-set mortars and methods for their formulation, and more particularly to low solids, high strength multi-use gelled mastic adhesives and adhesive mastics which can be used "as is" for the installation of various types of tile, flexible sheet goods, carpet and other uses, and can be mixed with a Portland cement and silica sand to form a powerful latex-modified mortar having the added utility of a crack suppressive adhesive and functioning as a waterproofing membrane.

2. Brief Description of the Prior Art

Latex-based adhesives have long been known and enjoy wide use. They owe their superior adhesion to their strong molecular attraction to the surface molecules of many types of substrates as well as strong cohesion between the latex molecules themselves. There is little value if an adhesive has superior "wetting" or "spreading" attraction and bonding to a substrate surface if the internal strength of the adhesive is so weak that the joint fails leaving adhesive on both surfaces or on either surface alone. Therefore the strength of an adhesive is dependent on the relative magnitude of the forces of cohesion between the adhesive molecules themselves (such as latex to latex) and the forces of surface energy adhesion (bonding) to the surfaces to be bonded (such as latex to the surfaces to be bonded together). If a material preferentially interacts with and bonds to a surface of a substance it will be a good adhesive provided it has sufficient internal strength to maintain the bond. For instance, water has excellent surface bonding strength or initial tack (it readily "wets" or "spreads" on a surface) but it has virtually no internal strength because the molecular attraction between water molecules themselves is very weak. This is the reason water molecules readily move so that the water conforms to the vessel in which it is held at ordinary temperatures.

Aqueous suspensions of latex can be formulated to make excellent adhesives by providing for the easy application and distribution of the latex. Suspending colloidal latex in water is therefore an efficient method to provide for the application of latex to surfaces. The terminal molecular groups of the latex have a strong affinity for substrates especially those high in oxygen and hydroxyl groups such as silicates and cellulose as present in ceramics, stone, wood and drywall. When the water is removed by evaporation, absorption or other means, the dispersed latex is forced together where they coalesce to produce the strong internal strength necessary for a good adhesive. Furthermore latex polymers retain some elasticity inherent to their linked component conjugated diene sub-units.

Adhesive applied with a trowel or by roller must be thickened sufficiently to allow efficient application and to prevent slippage of tile, stone or other layments especially with installations on walls.

Thickening of mastics may also be necessary to provide for the application of a heavy or thick layer especially used to assure sufficient adhesive to "wet" and bond to the material being installed in the presence of uneven surfaces, embossed tile backs, etc. Thickening has previously been achieved with the use of supposedly inert fillers such as calcium carbonate, clays, polysaccharides, gums, etc.

These fillers serve to thicken the aqueous latex polymer suspension but they are not totally inert and therefore may cause a multitude of problems. In the context of this patent they will continue to be referred to as inert fillers. As evaporation begins to remove the water, surface drying of these inert fillers causes the adhesive to "skin" or form a film on the surface of the adhesive. This skin blocks wetting of underside of the applied layment and prevents adequate bonding. The adhesives of the present invention retain their wet surface because there are no drying fillers and the gel strength will hold water minimizing evaporation while yet allowing the water to be released to the absorption of the layment and the substrate.

Conventional adhesives with a high loading of fillers will form skin that will have little tackiness and disallow the wetting of the layment undersurface resulting in bond failure. Therefore the open time necessary for the installer to spread the adhesive and then fit and make the installation becomes very limited. The installer is limited to the installation of sufficiently small areas that will not skin before the exposed mastic is covered. If this is not done, the skin causes weak joints to form due to the incomplete wetting of the undersurface of the layment which prevents the establishment of the surface energy necessary to produce the strong bond. Additionally the dry skin barrier dramatically slows further evaporation so that even if enough tackiness remained sufficiently long enough for wall tile to stick, the underlying moisture will allow the tile to slip after the tile is positioned. Furthermore, ceramic and vinyl tile, most sheet goods and other impervious materials act as additional efficient vapor barriers to prevent water evaporation or absorption thereby forming long-standing weak joints because, with inefficient water loss, the polymerization of the latex proceeds very slowly. It is much as though the mastic were left in an almost sealed shipping container.

The inert filler thickening agents greatly compromise the effective polymerization and coagulation of the latex. They mechanically interfere with the intermolecular attachments of the conjugated dienes that must polymerize for the adhesive to become functional. If the polymers are uninterrupted and continuous without having to bridge around and between molecules and particles of calcium carbonate, for instance, the resulting strength of the surface attachments and internal cohesion will be greatly enhanced. The inert fillers also produce undesired mechanical characteristics. Trowel applications require a strong hand and excellent technique for the inert fillers add significant weight and drag.

The present invention eliminates the large percentages (commonly 25% to 80%) of compromising inert fillers found in conventional mastic adhesives and provides a low solids, yet high strength latex adhesive. By using chemicals that stiffen the aqueous carrier after the desired additives such as latex are thoroughly mixed into the formulation, the present mastic adhesives require less than about 10% of inert fillers.

There are several patents which disclose the use of various types of latex to formulate adhesives and mastics but all require inert fillers and other materials in one form or another.

Takahashi et al, Japan patent JP 58017157A discloses a transparent gel that is prepared by using a highly water-absorbing synthetic resin (e.g. modified polysodium acrylate) as a gelling agent and adding to the gel at least one additive selected from among ethylenediamine-tetraacetic acid (or its disodium salt), triisopropanolamine, ethanolamine, n-propyl gellate, nickel dibutyldithiocarbamate, phenyl-alpha-naphthylamine and benzophenone derivative in an amount of 5 wt% or less, to prevent lowering of viscosity caused by sunlight, etc.

Bowden, U.S. Pat. No. 4,204,876 discloses a method of using thixotrophic compositions to carry additives in the liquid portion of cementitious products as a method of attempting to gain homogeneity of the end product.

Kwok et al, U.S. Pat. No. 4,471,082 discloses the use of a polyacrylic acid mixture as a thickening agent with a water based polymer in latex form to manufacture adhesives. The adhesives disclosed therein are re-wetable and designed to separate in the presence of water. There is no suggestion that the adhesives thus produced will function as a construction adhesive where a given degree of water resistance is mandatory and/or form a vapor barrier impervious to water.

Johansen et al, U.S. Pat. No. 5,558,708 discloses a "two-component" system and method for dispensing pigment in cement based composition using a predetermined and pre-packaged amount of an aqueous liquid pigment carrier component that is mixed with a predetermined and prepackaged amount of a powder cement component to obtain standardized colors. Vigorous stirring, shaking, or otherwise mixing of the pigment carrier component after storage and prior to combining with the powdered materials is required. Relatively large quantities of suspension enhancing agents are required that serve no other purpose. These agents mask, dilute, change, or otherwise compromise the final composition. Additionally, products with large quantities of suspending agents must be sold in small containers to facilitate shaking by the end user.

Johansen et al, U.S. Pat. No. 5,846,315 disclose a method for preparing a pigment dispersing pigment cement composition comprising water, pigment, a suspension enhancing agent and latex polymer solids. Two or more prepackaged compositions of an aqueous liquid pigment component is mixed with a prepackaged amount of a dry powder cement component to obtain cement composition with a uniform and standardized color. The suspension control agents, viscosity control agents, etc., two or more of which are required, are thoroughly mixed together prior to combining with the prepackaged dry powder cement. Agents that merely increase the viscosity of the aqueous component sufficient to carry the desired additives preclude their use in water in calciferous materials.

Johansen et al, U.S. Pat. No. 5,855,665 disclose a system and method for producing pigmented cement compositions that use significant percentages of only marginally effective suspension enhancing agents. Vigorous shaking, stirring, or otherwise mixing is still required which also limits container size to that which can be conveniently handled by workmen. Furthermore, the significant concentrations of suspension enhancing agents and dispersants required in the aqueous coloring composition can be deleterious to the makeup and strength of the end product. Additionally, the setting aids required are essential because the products also contain chemicals that compromise setting. These materials can also be detrimental to the ultimate strength of the final mix. This system also requires the mixing of additional water into the prepackaged pigmented cement compositions.

Dry-set mortars are Portland cement compositions that adhere by a chemical reaction between the Portland cement and water and therefore no evaporation is necessary or desired for hardening or "setting" to take place. In fact, they will "set" under water. These mortars are commonly referred to as "thinset" or "dry-set" mortars. Dry-set mortars have a much higher bond and compressive strength than mastic adhesives. Thus, tile installed with mortars are less likely to pop off, are more resistant to impact, and can support more weight than those installed with mastic adhesives. These are the primary reasons that mastic adhesives are reserved for wall and ceiling tile installation.

Only calcium silicates add to the strength of Portland cement. Tricalcium silicate is responsible for most of the early strength (first 7 days). Dicalcium silicate, which reacts more slowly, contributes only to the strength at later times. The other major components, tricalcium aluminate and tetracalcium aluminoferrite do not contribute significantly to the strength of the end product. The only contribution of tetracalcium aluminoferrite is to lend the gray color to cement (if it is removed, white Portland cement results). Every component must be hydrated and the rate of hydration of any one is affected by the varying concentration of the others.

Components of Portland cement that do not contribute significantly to the strength of the final product do hydrate and tie up water before the major strength components are hydrated and the strength of the finished product is thereby established. Clays, binders and other additives used only for suspension of additives contribute to the lack of strength of cement by physically interfering with calcium silicate hydrate crystal formation. If present, they will also interfere with water movement and the process of hydration of the important strength producing components of Portland cement so that its setting can be significantly delayed and the final product weakened. The cement to water ratio is the most critical factor in the production of a "perfect" cement product. Water not consumed in the hydration reaction will remain in the microstructure pore spaces. These pores make the cement product weaker due to the lack of strength forming calcium silicate hydrate bonds.

If extreme care is not taken in formulation, the cement matrix of a Portland cement mortar can suffer excessive retardation of "set" due to its inability to extract the water needed for hydration from the cellulose. It is vital to choose the correct type, viscosity, and amount of cellulose material. Failure can still occur unless it is distributed evenly in the end product.

In formulating mastics, latex is used to promote adhesion to various substrates. Latex and cellulose additives will foam in the manufacturing process; therefore defoamers are necessary to control air entrainment in manufacturing. Air entrainment in cementitious mortars will cause a "false set" (the mortar getting crumbly while being troweled). Avoiding air entrainment is far more important in mortars than mastic adhesives.

Agents used for suspending additives in mastic adhesives or mortars that serve no purpose other than to keep the desired additives from separating out will weaken the end product by their very presence. Multiple-use products, such as methylcellulose, are used for thickening and water retention in mastics. If used in excessive amounts, these products will prevent the mastic adhesives from drying and the bond between the tile and the substrate will be weak.

Additionally, additives that serve no purpose other than to aid in the suspension of components in the aqueous portion when added to Portland cement will interfere with the proper set of the resulting mortar by interfering with the crystallization of the calcium silicates. Because of the inefficiency of most such suspension agents, they are often used in significant quantities. Also any material other than water and the proper sand, when added to Portland cement, will compromise the strength of the end product. Limiting the quantity of additives therefore is imperative.

The present invention overcomes the problems discussed above, and is distinguished over the prior art in general, by a low-solids, high strength multi-use homogeneous breakable gelled adhesive or adhesive mastic which can be used "as is" for the installation of various types of tile, including tiles with deeply grooved backs, stone, marble, and other floor and wall coverings, flexible sheet goods, carpet and other uses, and can be mixed with a Portland cement powder to form a powerful latex-modified mortar. The stabilized gelled adhesive or mastic prevents the separation and settling of components, and when Portland powdered cement is added, becomes a high strength latex modified mortar.

The present invention virtually eliminates carriers that serve only to suspend additives in the mastic, thus, the workability of the mastic adhesives and mortar that results from mixing the gelled adhesive mastic of this invention with Portland cement is greatly enhanced. The amount of suspension or thickening agents in the present invention are far less than 5% of the total mixture. Because the present gelled adhesive and adhesive mastics become fluid when a filler such as Portland cement is added, the addition of more Portland cement will give a resultant viscosity sufficient to function as a latex modified mortar thereby supplying the necessary free water for the Portland cement to use in the hydration process and giving the strength expected of a mortar. Due to the even distribution of water in the matrix, gel-based mastic adhesives of the present invention impart homogeneous water availability, thereby making the necessary water available for the hydration process of the added Portland cement which imparts the required strength to the resultant tile adhesive bond.

SUMMARY OF THE INVENTION

It is therefore an object of the present invention to provide a multi-use gelled adhesive or adhesive mastic that is ready to use "as-is" when taken from the shipping container and does not require mixing or stirring prior to use.

It is another object of this invention to provide a multi-use gelled adhesive or adhesive mastic that has greater workability and ease of use than conventional mastic adhesives and has creamy no-slip characteristics, abundant adjustability time, and excellent tack time with no preparation.

Another object of this invention is to provide a multi-use gelled adhesive or adhesive mastic that has a long shelf life and is exceptionally resistant to drying and setting in the shipping container if it is completely resealed after partial use.

Another object of this invention is to provide a multi-use gelled adhesive or adhesive mastic that may be used in the installation of ceramic, vitreous and semi-vitreous tile and stone and similar materials.

Another object of this invention is to provide an easily measured homogeneous non-separating breakable gelled adhesive or adhesive mastic that becomes liquid upon contact with Portland cement type products for easy mixing therewith.

Another object of this invention is to provide a multi-use homogeneous breakable gelled adhesive or adhesive mastic including selected additives which can be mixed with a Portland cement/sand mix to produce an easily mixed homogeneous dry-set mortar, and serves as the source of all liquids required and thereby eliminating further additions of any liquids when mixing.

Another object of this invention is to provide a multi-use adhesive or adhesive mastic which will support the weight of standard wall tiles installed on a vertical surface with sufficient gel strength to prevent slippage or sliding of the tiles on the vertical surface.

Another object of this invention is to provide a multi-use gelled adhesive or adhesive mastic which may be modified by the addition of Portland cement and aggregate mixtures to set deeply embossed-backed floor tiles which significantly reduces water absorption by the layment.

Another object of this invention is to provide a multi-use gelled adhesive or adhesive mastic which may be formulated for use in the installation of thin soft or resilient tile, sheet goods, linoleum and similar materials, that can be applied to the substrate with a roller, brush or similar means, and formulated to a trowelable consistency for use in the installation of carpet, heavy vitreous or semi-vitreous tiles.

Another object of this invention is to provide a multi-use gelled adhesive or adhesive mastic which, when Portland cement materials are added, will more than double the volume of the adhesive thereby reducing the overall cost of the mastic while increasing the excellent adhesion qualities of the undiluted mastic adhesives.

Another object of this invention is to provide a multi-use gelled adhesive or adhesive mastic that emits no volatile organic compounds (VOCs).

A further object of this invention is to provide a multi-use gelled adhesive or adhesive mastic for use in the bonding of wood to wood and other products or any material that has surface molecules that contain oxygen, hydroxyl groups, or any other chemical structure such as silica or cellulose that is attractive to the conjugated dienes that make up latex.

A still further object of this invention is to provide a multi-use gelled adhesive or adhesive mastic that, upon drying, forms a resilient waterproof membrane that protects the substrate from water, provides soundproofing qualities, and is crack suppressive.

Other objects of the invention will become apparent from time to time throughout the specification and claims as hereinafter related.

The above noted objects and other objects of the invention are accomplished by a multi-use homogeneous breakable gelled adhesive or adhesive mastic which can be used for the installation of various types of tile, including tiles with deeply grooved backs, stone, marble, and other floor and wall coverings, flexible sheet goods, carpet and other uses, and can be mixed with a Portland cement powder/sand mix to form a powerful latex-modified mortar having the added utility of a crack suppressive adhesive and functioning as a waterproofing membrane. The stabilized gelled adhesive or mastic adhesive prevents the separation and settling of components, and when Portland powdered cement/sand mix is added, becomes a high strength latex modified mortar. The gelled mastic adhesive is usable as a dry-set mortar, and on the addition of Portland cement/mix, the gel will break and become a free-flowing liquid with additives thereby allowing precise quantitation and easy mixing to produce a homogeneous latex modified thinset mortar that assumes the texture of a trowelable thinset mortar as more Portland cement/silica sand is added.

DESCRIPTION OF THE PREFERRED EMBODIMENTS

Aqueous emulsions of latex in its various forms are known in the art. The latex must be suspended in the water carrier in such a manner that it is easily applied to the surfaces to be bonded. The present invention utilizes gelled water as a carrier which implements the formulation of an adhesive mixture that is easily applied to surfaces and supplies the initial tack required for easy installation of and bonding to the layment and then changes to provide the internal cohesive strength necessary for securely bonding the layment to the substrate.

The following examples are preferred embodiments of the aqueous gelled latex mastic adhesive that are formulated for various applications dictated by the chemical makeup of the layment backing and the substrate as well as its mechanical configuration. For example concrete may have an almost slick finish and yet must accept the ribbed or uneven underside of ceramic or vitreous tile, stone or carpet.

The examples below exhibit superior adhesion characteristics and greatly exceed test requirements as contained in the American National Standards, ANSI A136.1-1986, for organic adhesives for the installation of ceramic tile, both Types I and Types II. These formulations also allow the aqueous gelled latex mastic adhesive product to be mixed with Portland cement/sand mix to produce a modified latex Portland cement mortar that meets or surpasses ANSI A118.4-1985 specifications for Latex-Portland Cement Mortar, which can be used for installation of all types of tile including tiles with deeply grooved backs, stone, marble, and other floor and wall coverings.

In the following examples a gelling agent, such as a cross-linked polyacrylic acid or other suitable gelling agent, is mixed with the water to significantly lower the pH of the water. The gelling component also serves to encapsulate the latex binder component. Cellulose derived thickeners such as hydroxy ethyl cellulose, hydroxy methyl cellulose, hydroxy propyl cellulose, carboxy methyl cellulose, sodium CMC and other cellulose of a similar nature are used which function to resist the extraction of water from the mastic. A preferred chelating agent for use is EDTA (ethylene diamine tetraacetic acid) which functions as a binder to bind up the free calcium in the water. The fungicide/preservative is an anti-microbial agent suitable for use with cellulose and latex products, which prevents microbial degradation in the container and extends shelf life. A surfactant, such as an alkylphenol ethoxylate, a reaction product of alkylphenol and ethylene oxide, that is suitable for use with cellulose and latex products is used to reduce the surface tension of the mixture. The glycol functions to lower the freezing point of the composition.

Highly tackified latex polymer compounds such as butadiene rubber latex, butadiene-styrene, acrylic or a combination thereof, or other latex compounds may be used. Latex and cellulose additives tend to foam in the manufacturing process and a suitable anti-foaming agent is used to control air entrainment in the adhesive. As described hereinafter, when the mastic adhesive is mixed with a calcium-containing powdered cementitious material such as a Portland cement/sand mix the anti-foaming agent will prevent air entrainment in the cementitious mortar which may otherwise cause a "false set" (the mortar getting crumbly while being troweled).

The neutralizing agent, such as an alkaline electrolyte, triethanolamine, a mixture of sodium hydroxide and water, a dilute mixture of an amine component, or other neutralizing compound, serves to adjust the pH so that a smooth gelled mastic adhesive is produced. It should be understood that the formulations for the gelled mastic adhesive may also include one or various combinations of other additives.

In the following examples each ingredient is added to water in the order listed and is completely dispersed and thoroughly mixed before adding the next ingredient. After thorough mixing, the mixture forms a homogeneous low-solids, high-strength gelled mastic adhesive which has the consistency of a custard or jelly. The viscosity level of the finished gel may range from about 4,000 to about 200,000 centipoise (typically from about 12,500 to about 200,000 centipoise).

EXAMPLE 1

| Mixing Order | Ingredient | Weight in Pounds | Preferred % by Weight | % by Weight Range |
|---|---|---|---|---|
| 1 | Water | 10.8 | 52.887% | 35.832% to 85.772% |
| 2 | Gelling Agent | 0.28 | 1.371% | 0.047% to 2.654% |
| 3 | Cellulose Thickener | 0.006 | 0.293% | 0.008% to 2.654% |
| 4 | Chelating Agent | 0.01 | 0.049% | 0.006% to 1.161% |
| 5 | Fungicide/Preservative | 0.01 | 0.049% | 0.006% to 1.161% |
| 6 | Surfactant | 0.022 | 0.107% | 0.002% to 0.399% |
| 7 | Glycol | 0.143 | 0.700% | 0.127% to 1.659% |
| 8 | Anti-Foaming Agent | 0.08 | 0.392% | 0.005% to 1.161% |
| 9 | Latex Polymer | 8.81 | 43.141% | 13.978% to 50.763% |
| 10 | Neutralizing agent | 0.26 | 1.273% | 0.048% to 2.654% |

EXAMPLE 2

| Mixing Order | Ingredient | Weight in Pounds | Preferred % by Weight | % by Weight Range |
|---|---|---|---|---|
| 1 | Water | 10.8 | 52.732% | 35.832% to 85.772% |
| 2 | Gelling Agent | 0.28 | 1.367% | 0.048% to 2.654% |
| 3 | Cellulose Thickener | 0.066 | 0.322% | 0.008% to 2.654% |
| 4 | Chelating Agent | 0.01 | 0.049% | 0.006% to 1.161% |

-continued

EXAMPLE 2

| Mixing Order | Ingredient | Weight in Pounds | Preferred % by Weight | % by Weight Range |
| --- | --- | --- | --- | --- |
| 5 | Fungicide/Preservative | 0.01 | 0.049% | 0.006% to 1.161% |
| 6 | Surfactant | 0.022 | 0.107% | 0.002% to 0.299% |
| 7 | Glycol | 0.143 | 0.698% | 0.127% to 1.659% |
| 8 | Anti-Foaming Agent | 0.08 | 0.391% | 0.006% to 1.161% |
| 9 | Latex Polymer | 8.81 | 43.015% | 13.978% to 50.763% |
| 10 | Neutralizing agent | 0.26 | 1.269% | 0.048% to 2.654% |

EXAMPLE 3

| Mixing Order | Ingredient | Weight in Pounds | Preferred % by Weight | % by Weight Range |
| --- | --- | --- | --- | --- |
| 1 | Water | 10.8 | 87.919% | 74.227% to 96.759% |
| 2 | Gelling Agent | 0.06 | 0.488% | 0.063% to 0.67% |
| 3 | Cellulose Thickener | 0.01 | 0.081% | 0.009% to 0.687% |
| 4 | Chelating Agent | 0.01 | 0.081% | 0.000% to 0.687% |
| 5 | Fungicide/Preservative | 0.01 | 0.081% | 0.000% to 0.687% |
| 6 | Surfactant | 0.004 | 0.032% | 0.018% to 0.687% |
| 7 | Glycol | 0.13 | 1.058% | 0.002% to 0.687% |
| 8 | Anti-Foaming Agent | 0.08 | 0.651% | 0.063% to 2.405% |
| 9 | Latex Polymer | 1.13 | 9.199% | 3.156% to 15.808% |
| 10 | Neutralizing agent | 0.05 | 0.407% | 0.007% to 3.436% |

EXAMPLE 4

| Mixing Order | Ingredient | Weight in Pounds | Preferred % by Weight | % by Weight Range |
| --- | --- | --- | --- | --- |
| 1 | Water | 10.8 | 87.919% | 74.227% to 96.769% |
| 2 | Gelling Agent | 0.06 | 0.488% | 0.063% to 0.687% |
| 3 | Cellulose Thickener | 0.01 | 0.081% | 0.009% to 0.687% |
| 4 | Chelating Agent | 0.01 | 0.081% | 0.000% to 0.687% |
| 5 | Fungicide/Preservative | 0.01 | 0.081% | 0.000% to 0.687% |
| 6 | Surfactant | 0.004 | 0.033% | 0.016% to 0.687% |
| 7 | Glycol | 0.13 | 1.058% | 0.002% to 0.687% |
| 8 | Anti-Foaming Agent | 0.08 | 0.651% | 0.006% to 2.405% |
| 9 | Latex Polymer | 1.13 | 9.199% | 3.136% to 15.808% |
| 10 | Neutralizing agent | 0.05 | 0.407% | 0.007% to 3.436% |

EXAMPLE 5

| Mixing Order | Ingredient | Weight in Pounds | Preferred % by Weight | % by Weight Range |
| --- | --- | --- | --- | --- |
| 1 | Water | 3.2 | 77.745% | 54.237% to 95.579% |
| 2 | Gelling Agent | 0.06 | 1.371% | 0.206% to 1.695% |
| 3 | Cellulose Thickener | 0.01 | 0.293% | 0.029% to 1.695% |
| 4 | Chelating Agent | 0.001 | 0.049% | 0.0002% to 1.695% |
| 5 | Fungicide/Preservative | 0.001 | 0.049% | 0.0002% to 1.695% |
| 6 | Surfactant | 0.004 | 0.107% | 0.006% to 1.695% |
| 7 | Glycol | 0.03 | 0.700% | 0.029% to 1.695% |
| 8 | Anti-Foaming Agent | 0.02 | 0.392% | 0.239% to 1.695% |
| 9 | Latex Polymer | 0.74 | 43.141% | 3.883% to 25.424% |
| 10 | Neutralizing agent | 0.05 | 1.273% | 0.024% to 8.475% |

EXAMPLE 6

| Mixing Order | Ingredient | Weight in Pounds | Preferred % by Weight | % by Weight Range |
|---|---|---|---|---|
| 1 | Water | 10.0 | 50.810% | 29.850% to 90.807% |
| 2 | Gelling Agent | 0.28 | 1.423% | 0.054% to 0.896% |
| 3 | Cellulose Thickener | 0.066 | 0.335% | 0.000% to 2.687% |
| 4 | Chelating Agent | 0.01 | 0.051% | 0.003% to 0.657% |
| 5 | Fungicide/Preservative | 0.01 | 0.051% | 0.003% to 0.657% |
| 6 | Surfactant | 0.022 | 0.112% | 0.000% to 0.298% |
| 7 | Glycol | 0.143 | 0.726% | 0.000% to 1.493% |
| 8 | Anti-Foaming Agent | 0.08 | 0.406% | 0.006% to 1.075% |
| 9 | Latex Polymer | 8.81 | 44.764% | 9.080% to 59.701% |
| 10 | Neutralizing agent | 0.26 | 1.321% | 0.045% to 2.687% |

EXAMPLE 7

| Mixing Order | Ingredient | Weight in Pounds | Preferred % by Weight | % by Weight Range |
|---|---|---|---|---|
| 1 | Water | 10.0 | 49.321% | 29.850% to 90.807% |
| 2 | Gelling Agent | 0.28 | 1.381% | 0.054% to 0.896% |
| 3 | Cellulose Thickener | 0.66 | 3.255% | 0.000% to 2.686% |
| 4 | Chelating Agent | 0.01 | 0.049% | 0.003% to 0.657% |
| 5 | Fungicide/Preservative | 0.01 | 0.049% | 0.003% to 0.657% |
| 6 | Surfactant | 0.022 | 0.108% | 0.000% to 0.298% |
| 7 | Glycol | 0.143 | 0.705% | 0.000% to 1.493% |
| 8 | Anti-Foaming Agent | 0.08 | 0.395% | 0.006% to 1.107% |
| 9 | Latex Polymer | 8.81 | 43.452% | 9.081% to 58.701% |
| 10 | Neutralizing agent | 0.26 | 1.282% | 0.045% to 2.686% |

EXAMPLE 8

| Mixing Order | Ingredient | Weight in Pounds | Preferred % by Weight | % by Weight Range |
|---|---|---|---|---|
| 1 | Water | 10.0 | 50.981% | 30.229% to 90.807% |
| 2 | Gelling Agent | 0.28 | 1.427% | 0.054% to 2.418% |
| 3 | Chelating Agent | 0.01 | 0.051% | 0.003% to 0.665% |
| 4 | Fungicide/Preservative | 0.01 | 0.051% | 0.003% to 0.665% |
| 5 | Surfactant | 0.022 | 0.112% | 0.000% to 0.272% |
| 6 | Glycol | 0.143 | 0.729% | 0.000% to 1.511% |
| 7 | Anti-Foaming Agent | 0.08 | 0.408% | 0.006% to 1.058% |
| 8 | Latex Polymer | 8.81 | 44.915% | 9.081% to 60.459% |
| 9 | Neutralizing agent | 0.26 | 1.325% | 0.045% to 2.721% |

The examples above provide superior adhesion characteristics and greatly exceed test requirements as contained in the American National Standards, ANSI A136.1-1986, for organic adhesives for the installation of ceramic tile, both Types I and Types II. These formulations also allow the gelled latex mastic adhesive product to be mixed with a Portland cement/sand mix to produce a modified latex Portland cement mortar that meets or surpasses ANSI A118.4-1985 specifications for Latex-Portland Cement Mortar, which can be used for installation of all types of tile including tiles with deeply grooved backs, stone, marble, and other floor and wall coverings.

The breakable gelled adhesive will remain stable and uniform in consistency for immediate use with no mixing or stirring required upon opening of the container while at the same time resisting drying, setting, and microbial degradation in the container. The components of the gelled mastic adhesive examples described above are completely suspended in a uniform yet breakable gel. It reverts almost instantly to a liquid on contact with the many electrolytes and polyvalent cations such as those present when any calciferous material like Portland cement powder contacts the gel.

Because the present gelled mastic adhesive becomes fluid when a filler such as Portland cement is added, the addition of more Portland cement will give a resultant viscosity sufficient to function as a dry-set mortar thereby supplying the necessary free water for the Portland cement to use in the hydration process and giving the strength expected of a dry-set mortar. Due to the even distribution of water in the matrix, gel-based mastic adhesives of the present invention impart homogeneous water availability, thereby making the necessary water available for the hydration process of the added Portland cement which imparts the required strength to the resultant adhesive bond.

To produce a modified latex-Portland cement mortar, the appropriate formulation is added and thoroughly mixed in the field with approximately three parts of a Portland cement/sand mix just prior to application. The ability of the high viscosity gelled mastic adhesive to receive the powdered Portland cement/sand mix is facilitated by the breaking of the gel into a liquid. The addition of more cementitious powder with additional mixing brings the paste to trowelable consistency like that of traditional dry-set mortars. A suitable mixture for use with a notched trowel would be from about 2 to 4 parts Portland cement/sand mix to 1 part gelled adhesive, and for roll-on application about 0.5 to about 3.5 parts Portland cement to 1 part gelled adhesive.

The present mastic adhesive requires minimal effort to spread because it lacks the gums, clays, calcium carbonate and other inert fillers previously used in such adhesives that are both heavy and produce significant drag. Also the lack of these fillers allows the use of far less adhesive mastic on the various installations. A more shallow notched trowel can be used and still supply sufficient adhesive for a excellent bond. Also with the high relative latex content of the dried adhesive, it establishes an excellent sound barrier and a waterproof membrane.

The present low solids mastic adhesive leaves no underlying application pattern that is formed by the notched trowel used by the applicator. Notched trowels are used to form ridges in the applied mastic thus providing for dependable wetting of the underside of the layment. High solids mastic adhesives leave a pattern of these solids that elevate thin soft or resilient layments so that upon heavy use there will be wear patterns reflective of the accumulated solids. The absence of these solids eliminates the underlying support required to elevate the thin tile sufficiently to produce the surface wear patterns commonly seen in high traffic areas this greatly extending the beauty and useful life of the layment.

While this invention has been described fully and completely with special emphasis upon preferred embodiments, it should be understood that within the scope of the appended claims the invention may be practiced otherwise than as specifically described herein.

What is claimed is:

1. A multi-use viscous breakable gel adhesive composition capable of use as an adhesive or adhesive mastic and as a base for forming a latex modified mortar, comprising a mixture of:
   water;
   a gelling agent in an effective amount sufficient to significantly lower the pH of the mixture;
   a chelating agent in an effective amount sufficient to bind excess ions the mixture;
   an anti-microbial agent in an effective amount sufficient to prevents microbial degradation in the mixture;
   a surfactant in an effective amount sufficient to reduce the surface tension of the mixture;
   glycol in an effective amount sufficient to lower the freezing point of the components;
   an anti-foaming agent in an effective amount sufficient to control air entrainment in the mixture;
   a latex polymer; and
   a neutralizing viscosity increasing agent in an effective amount sufficient to raise the pH and form the mixture into a gel with a viscosity level having the consistency of a custard or jelly;
   said gel adhesive or adhesive mastic having a viscosity level in the range of from about 4,000 to about 200,000 centipoise with the consistency of a custard or jelly, and characterized by functioning as a stable gel adhesive or adhesive mastic and upon mixing with a powdered calcium-containing cementitious material, breaking to become a free flowing liquid for hydrating the cementitious material and, after mixing therewith, forming a homogeneous high-strength latex modified mortar.

2. The composition according to claim 1, wherein the amount of said water is from about 29% to about 98% by weight.

3. The composition according to claim 1, wherein the amount of said glycol is from about 0.0001% to about 5.0% by weight.

4. The composition according to claim 1, wherein the amount of said surfactant is from about 0.0001% to about 3.0% by weight.

5. The composition according to claim 1, wherein the amount of said gelling agent is from about 0.4% to about 5.0% by weight.

6. The composition according to claim 1, wherein the amount of said anti-foaming agent is from about 0.005% to about 2.41% by weight.

7. The composition according to claim 1, wherein the amount of said latex polymer is from about 3.1% to about 60.5% by weight.

8. The composition according to claim 1, wherein the amount of said anti-microbial agent is from about 0.0001% to about 1.7% by weight.

9. The composition according to claim 1, wherein the amount of said chelating agent is from about 0.0001% to about 1.7% by weight.

10. The composition according to claim 1, wherein the amount of said neutralizing viscosity increasing agent is from about 0.007% to about 8.5% by weight.

11. The composition according to claim 1, further comprising
    a cellulose derived thickening agent in an effective amount sufficient to resist the extraction of water from the mixture.

12. The composition according to claim 11, wherein the amount of said cellulose derived thickening agent is from about 0.001% to about 3.0% by weight.

13. The composition according to claim 11, wherein the amount of said water is from about 29% to about 98% by weight.

14. The composition according to claim 11, wherein the amount of said glycol is from about 0.0001% to about 5.0% by weight.

15. The composition according to claim 11, wherein the amount of said surfactant is from about 0.0001% to about 3.0% by weight.

16. The composition according to claim 11, wherein the amount of said gelling agent is from about 0.4% to about 5.0% by weight.

17. The composition according to claim 11, wherein the amount of said anti-foaming agent is from about 0.005% to about 2.41% by weight.

18. The composition according to claim 11, wherein the amount of said latex polymer is from about 3.1% to about 60.5% by weight.

19. The composition according to claim 11, wherein the amount of said anti-microbial agent is from about 0.0001% to about 1.7% by weight.

20. The composition according to claim 11, wherein the amount of said chelating agent is from about 0.0001% to about 1.7% by weight.

21. The composition according to claim 11, wherein
the amount of said neutralizing viscosity increasing agent is from about 0.007% to about 8.5% by weight.

22. The method of making a multi-use viscous breakable gel adhesive or adhesive mastic composition capable of use as an adhesive or adhesive mastic and as a base for forming a latex modified mortar, comprising the steps of:
(a) mixing a gelling agent in water until completely dispersed therein;
(b) mixing a chelating agent into the solution until completely dispersed therein;
(c) mixing an anti-microbial agent into the solution until completely dispersed therein;
(d) mixing a surfactant into the solution until completely dispersed therein;
(e) mixing glycol in water until completely dispersed therein;
(f) mixing an anti-foaming agent into the solution until completely dispersed therein;
(g) mixing a latex polymer into the solution until completely dispersed therein; and
(h) mixing a neutralizing agent into the solution until completely dispersed therein; whereupon
a viscous homogeneous breakable gel adhesive or adhesive mastic is formed having a viscosity level in the range of from about 4,000 to about 200,000 centipoise with the consistency of a custard or jelly, and characterized by functioning as a stable gel adhesive or adhesive mastic and upon mixing with a powdered calcium-containing cementitious material, breaking to become a free flowing liquid for hydrating the cementitious material and, after mixing therewith, forming a homogeneous high-strength latex modified mortar.

23. The method according to claim 22, further comprising the intermediate step of
prior to mixing said chelating agent into the solution, mixing a cellulose derived thickening agent in the water/gelling agent solution until completely dispersed therein, and then mixing the chelating agent into the solution until completely dispersed therein, and thereafter completing the recited steps.

* * * * *